US011030307B2

(12) United States Patent
Faitelson

(10) Patent No.: US 11,030,307 B2
(45) Date of Patent: Jun. 8, 2021

(54) AUDIT LOG ENHANCEMENT

(71) Applicant: VARONIS SYSTEMS LTD., Herzlia (IL)

(72) Inventor: Yakov Faitelson, New York, NY (US)

(73) Assignee: VARONIS SYSTEMS LTD., Herzlia (IL)

( * ) Notice: Subject to any disclaimer, the term of this patent is extended or adjusted under 35 U.S.C. 154(b) by 272 days.

(21) Appl. No.: 15/546,853

(22) PCT Filed: Jun. 1, 2017

(86) PCT No.: PCT/IL2017/050608
§ 371 (c)(1),
(2) Date: Jul. 27, 2017

(87) PCT Pub. No.: WO2017/208241
PCT Pub. Date: Dec. 7, 2017

(65) Prior Publication Data
US 2018/0218152 A1    Aug. 2, 2018

Related U.S. Application Data

(60) Provisional application No. 62/344,634, filed on Jun. 2, 2016.

(51) Int. Cl.
*G06F 21/55* (2013.01)
*G06F 11/34* (2006.01)
(Continued)

(52) U.S. Cl.
CPC ........ *G06F 21/552* (2013.01); *G06F 11/3438* (2013.01); *G06F 16/951* (2019.01);
(Continued)

(58) Field of Classification Search
CPC ........ G06F 21/522; G06F 21/50; G06F 21/55; G06F 21/60; G06F 21/71; G06F 21/78;
(Continued)

(56) References Cited

U.S. PATENT DOCUMENTS 8,572,262 B2    10/2013    Ensing et al.
8,578,507 B2 *  11/2013    Faitelson .............. G06F 21/604
                                                                  726/28
(Continued)

OTHER PUBLICATIONS

An International Search Report and a Written Opinion both dated Nov. 29, 2017, which issued during the prosecution of Applicant's PCT/IL2017/050608.
(Continued)

*Primary Examiner* — Alexander Lagor
*Assistant Examiner* — Vu V Tran

(57) ABSTRACT

A system for monitoring actual access to data elements in an enterprise computer network and providing associated data, the system including an at least near real time data element audit subsystem providing audit output data including at least one of a time stamp, identification of an accessor, user depository stored data regarding the accessor, accessed data element data, affected data element data, type of access operation, source IP address of access and access outcome data, in at least near real time, relating to actual access to data elements in the enterprise computer network, and an additional data providing subsystem receiving in at least near real time at least a part of the audit output data and utilizing the at least part of the audit output data for providing additional data which is not part of the audit output data.

19 Claims, 10 Drawing Sheets

(51) Int. Cl.
*H04L 12/58* (2006.01)
*H04L 29/08* (2006.01)
*H04L 29/12* (2006.01)
*H04L 29/06* (2006.01)
*G06F 16/951* (2019.01)

(52) U.S. Cl.
CPC .............. *H04L 51/32* (2013.01); *H04L 67/22* (2013.01); *H04L 67/32* (2013.01); *G06F 2221/2101* (2013.01); *G06F 2221/2151* (2013.01); *H04L 61/2007* (2013.01)

(58) Field of Classification Search
CPC ......... G06F 11/3438; G06F 2221/2151; G06F 2221/2101; G06F 21/552; G06F 16/951; H04L 67/22; H04L 67/32; H04L 63/1408; H04L 2463/121; H04L 61/2007; H04L 51/32
See application file for complete search history.

(56) References Cited

U.S. PATENT DOCUMENTS

| | | | |
|---|---|---|---|
| 8,615,605 | B2 | 12/2013 | Yu et al. |
| 9,853,992 | B1* | 12/2017 | Kumar ................ H04L 63/1425 |
| 9,870,370 | B2 | 1/2018 | Faitelson et al. |
| 10,248,696 | B2 | 4/2019 | White et al. |
| 2006/0287902 | A1* | 12/2006 | Helsper ................. G06Q 30/06 235/382 |
| 2012/0210425 | A1* | 8/2012 | Porras ................... H04L 41/142 726/22 |
| 2013/0179219 | A1* | 7/2013 | Ross ................... G06Q 30/0202 705/7.31 |
| 2013/0297689 | A1 | 11/2013 | Bhat et al. |
| 2013/0347106 | A1 | 12/2013 | Long |
| 2015/0089614 | A1 | 3/2015 | Mathew et al. |
| 2016/0078353 | A1 | 3/2016 | Shen et al. |
| 2016/0105801 | A1* | 4/2016 | Wittenberg ........... H04W 4/021 455/411 |
| 2018/0027006 | A1* | 1/2018 | Zimmermann ........... G06F 9/46 726/11 |
| 2018/0218152 | A1 | 8/2018 | Faitelson |

OTHER PUBLICATIONS

An Invitation to pay additional fees dated Oct. 4, 2017, which issued during the prosecution of Applicant's PCT/IL2017/050608.
U.S. Appl. No. 62/344,634, filed Jun. 2, 2016.
USPTO NFOA dated Jun. 27, 2019 in connection with U.S. Appl. No. 15/805,758.
An Office Action dated May 18, 2020, which issued during the prosecution, U.S. Appl. No. 15/805,855.
Notice of Allowance dated Jul. 27, 2020, which issued during the prosecution of U.S. Appl. No. 15/805,758.
European Search Report dated Oct. 20, 2020 which issued during the prosecution, of Applicant's European App No. 17806030.7.
Anonymous: "Monitor User Activity on Windows Server Network Enterprise Network Security Blog from ISDecisions", May 20, 2016 (May 20, 2016), XP055644014, Retrieved from the Internet: URL: https://web.archive.org/web/20160520001559/https://www.isdecisions.com/blog/it-security/monitor-user-activity-on-windowsserver-network/ [retrieved on Nov. 19, 2019].

* cited by examiner

AUDIT LOG ENHANCEMENT

REFERENCE TO RELATED APPLICATIONS

Reference is hereby made to U.S. Provisional Patent Application 62/344,634, entitled AUDIT LOG ENRICHMENT, filed Jun. 2, 2016, the disclosure of which is hereby incorporated by reference and priority of which is hereby claimed pursuant to 37 CFR 1.78(a)(4) and (5)(i).

Reference is also made to the following US patents and patent applications, owned by the assignee, the disclosures of which are hereby incorporated by reference:

U.S. Pat. Nos. 7,555,482; 7,606,801; 8,561,146; 8,239,925; 8,438,611; 8,438,612; 8,601,592; 8,578,507; 8,805,884; 8,533,787; 8,909,673; 9,147,180; and U.S. Published Patent Application Nos. 2009/0265780; 2011/0010758; 2011/0061093; 2011/0296490; and 2012/0271853.

FIELD OF THE INVENTION

The present invention relates generally to audit logging and more specifically to monitoring of actual access to data elements in an enterprise computer network.

BACKGROUND OF THE INVENTION

Various types of audit log systems are known in the art.

SUMMARY OF THE INVENTION

The present invention seeks to provide improved systems and methods relating to monitoring of actual access to data elements in an enterprise computer network and providing corresponding notifications thereof, where relevant.

There is thus provided in accordance with a preferred embodiment of the present invention a system for monitoring actual access to data elements in an enterprise computer network and providing associated data, the system including an at least near real time data element audit subsystem providing audit output data including at least one of a time stamp, identification of an accessor, user depository stored data regarding the accessor, accessed data element data, affected data element data, type of access operation, source IP address of access and access outcome data, in at least near real time, relating to actual access to data elements in the enterprise computer network, and an additional data providing subsystem receiving in at least near real time at least a part of the audit output data and utilizing the at least part of the audit output data for providing additional data which is not part of the audit output data.

Preferably, the additional data providing subsystem provides the additional data from at least one data source within the enterprise computer network.

Additionally or alternatively, the additional data providing subsystem provides the additional data from at least one data source outside of the enterprise computer network.

Preferably, the additional data providing subsystem automatically provides the additional data from at least one data source in response to the audit output data received from the at least near real time data element audit subsystem.

Preferably, the additional data providing subsystem automatically searches the enterprise computer network in order to find data sources useful to the additional data providing subsystem.

There is further provided in accordance with another preferred embodiment of the present invention a method for monitoring actual access to data elements in an enterprise computer network and providing associated data, the method including providing in at least near real time audit output data including at least one of a time stamp, identification of an accessor, user depository stored data regarding the accessor, accessed data element data, affected data element data, type of access operation, source IP address of access and access outcome data, in at least near real time, relating to actual access to data elements in the enterprise computer network and receiving at least part of the audit output data and utilizing the at least part of the audit output data for providing data which is not part of the audit output data.

Preferably, the additional data is received from at least one data source within the enterprise computer network.

Additionally or alternatively, the additional data is received from at least one data source outside of the enterprise computer network.

Preferably, the receiving and the utilizing occur automatically in at least near real time.

Preferably, the method also includes automatically searching the enterprise computer network in order to find useful data sources.

There is additionally provided in accordance with another preferred embodiment of the present invention a system for monitoring actual access to data elements in an enterprise computer network and providing associated data, the system including a data element audit subsystem providing audit data including at least data relating to time stamps of at least two actual accesses and IP addresses of computers used for the two actual accesses, an additional data providing subsystem receiving at least a part of the audit data and utilizing the at least part of the audit data for providing physical location data corresponding to the IP addresses of the computers used for the two actual accesses and a time and distance analysis engine indicating whether a time difference between the time stamps and a geographical separation between the physical locations of the at least two actual accesses may feasibly correspond one to another, in view of a minimum time duration required to physically travel between the physical locations of the at least two actual accesses.

Preferably, the data element audit subsystem provides the audit data in at least near real time.'

Preferably, the additional data providing subsystem provides the physical location data in at least near real time.

Preferably, the time and distance analysis engine provides an indication of whether the time difference between the time stamps and the geographical separation between the physical locations of the at least two actual accesses may feasibly correspond one to another in at least near real time.

Preferably, the additional data providing subsystem provides data from at least one data source outside of the enterprise computer network.

There is furthermore provided in accordance with an additional preferred embodiment of the present invention a method for monitoring actual access to data elements in an enterprise computer network and providing associated data, the method including providing audit data including at least data relating to time stamps of at least two actual accesses and IP addresses of computers used for the two actual accesses, receiving at least a part of the audit data and utilizing the at least part of the audit data for providing physical location data corresponding to the IP addresses of the computers used for the two actual accesses and indicating whether a time difference between the time stamps and a geographical separation between the physical locations of the at least two actual accesses may feasibly correspond one to another in view of a minimum time duration required to physically travel between the physical locations of the at least two actual accesses.

Preferably, the audit data is provided in at least near real time.

Preferably, the audit data is provided from at least one data source outside of the enterprise computer network.

Preferably, the additional data is provided from at least one data source outside of the enterprise computer network.

Preferably, the indication of whether a time difference between the time stamps and a geographical separation between the physical locations of the at least two actual accesses may feasibly correspond to each other is provided in at least near real time.

There is also provided in accordance with another preferred embodiment of the present invention a system for monitoring actual access to data elements in an enterprise computer network and providing associated data, the system including an at least near real time data element audit subsystem providing at least data relating to an individual performing at least one actual access and an additional data providing subsystem providing to the data element audit subsystem, social network data from a social network, relating to activity of the individual on the social network.

Preferably, the additional data providing subsystem provides the social network data in at least near real time.

Preferably, the system also includes a time window calculation subsystem configured to indicate whether the activity on the social network occurred within a predetermined time window.

Preferably, the additional data providing subsystem automatically provides the social network data in response to the data received from the data element audit subsystem.

Preferably, operation of the additional data providing subsystem is triggered by at least one occurrence of the activity on the social network of the individual.

Additionally or alternatively, operation of the additional data providing subsystem is triggered on a scheduled basis to analyze occurrence of activity on the social network of the individual.

Alternatively, operation of the additional data providing subsystem is continuously triggered to analyze ongoing activity on the social network of the individual.

Additionally or alternatively, operation of the additional data providing subsystem is triggered by at least one user-defined rule which is based at least on time and on occurrence of the activity.

Preferably, an output of the time window calculation subsystem triggers a retroactive analysis of past actual accesses to at least one data element in the enterprise computer network.

There is further provided in accordance with yet another preferred embodiment of the present invention a method for monitoring actual access to data elements in an enterprise computer network and providing associated data, the method including providing in at least near real time at least data relating to an individual performing at least one actual access and receiving at least part of the data relating to the individual performing at least one actual access and utilizing the part of the data relating to the individual performing at least one actual access for providing data from a social network, relating to activity on the social network by the individual.

Preferably, the method also includes providing an indication of whether the activity on the social network was done within a predetermined time window.

Preferably, the data from the social network is provided automatically in response to the receiving the data relating to the individual performing at least one actual access.

Additionally or alternatively, the providing data from the social network is triggered by at least one existence of predetermined activity on the social network by the individual.

Additionally or alternatively, the providing data from the social network occurs on at least a scheduled basis to analyze existence of predetermined activity on the social network by the individual.

Alternatively, the providing data from the social network occurs continuously to analyze ongoing activity on the social network by the individual.

Additionally or alternatively, the providing data from the social network occurs in accordance with at least one user-defined rule based at least on time and on existence of predetermined activity on the social network by the individual.

Preferably, the indication of whether the activity on the social network by the individual was done within a predetermined time window triggers a retroactive analysis of past actual accesses to at least one data element in the enterprise computer network.

There is also provided in accordance with another preferred embodiment of the present invention a system for monitoring actual access to data elements in an enterprise computer network and providing associated data, the system including an at least near real time data element audit subsystem providing at least data relating to a frequency of actual access of an individual to at least one data element, an additional data providing subsystem for providing social network data indicating existence of a predetermined activity of the individual on at least one social network and a frequency analysis correlation engine receiving outputs from the at least near real time data element audit subsystem and from the additional data providing subsystem and providing correlation data indicating the existence or non-existence of a relationship between timing of a change in the frequency of actual access and timing of the predetermined activity of the individual.

Preferably, the additional data providing subsystem provides the social network data in at least near real time.

Preferably, the frequency analysis correlation engine provides the correlation data indicating existence or non-existence of a relationship between timing of a change in the frequency of actual access and timing of the predetermined activity, in at least near real time.

There is additionally provided in accordance with another preferred embodiment of the present invention a method for monitoring actual access to data elements in an enterprise computer network and providing associated data, the method including providing in at least near real time at least data relating to a frequency of actual access of an individual to at least one data element, providing social network data indicating existence of a predetermined activity of the individual on at least one the social network and providing in at least near real time correlation data indicating existence or non-existence of a relationship between timing of a change in the frequency of actual access and timing of the predetermined activity of the individual.

There is furthermore provided in accordance with a further preferred embodiment of the present invention a system for monitoring actual access to data elements in an enterprise computer network and providing associated data, the system including an at least near real time data element audit subsystem providing at least data relating to an IP address of a computer used in at least one actual access to at least one data element, performed by an individual, an additional data providing subsystem for providing data indicating a malicious reputation of at least one IP address and an analysis engine receiving outputs from the at least near real time data element audit subsystem and from the additional data providing subsystem and providing data indicating that the IP address used in the at least one actual access performed by the individual has a malicious reputation.

Preferably, the additional data providing subsystem provides the data indicating a malicious reputation of at least one IP address, in at least near real time.

Preferably, the additional data providing subsystem provides data indicating a malicious reputation of at least one IP address, from at least one data source outside of the enterprise computer network.

Preferably, the analysis engine provides the data indicating that the IP address used in the at least one actual access performed by the individual has a malicious reputation in at least near real time.

Preferably, operation of the additional data providing subsystem is triggered by at least one existing actual access to at least one data element in the enterprise computer network.

Additionally or alternatively, operation of the additional data providing subsystem is triggered on a scheduled basis to analyze actual accesses to at least one data element in the enterprise computer network.

Additionally or alternatively, operation of the additional data providing subsystem is triggered by at least one user defined rule, which is based at least on time and on the existence of the actual access.

Preferably, a notification from an external source triggers operation of the analysis engine to provide a retroactive analysis of past actual accesses to at least one data element in the enterprise computer network.

Preferably, the notification triggers scrutiny of future actual accesses to at least one data element in the enterprise computer network.

There is also provided in accordance with still a further preferred embodiment of the present invention a method for monitoring actual access to data elements in an enterprise computer network and providing associated data, the method including providing in at least near real time at least data relating to an IP address of a computer used in at least one actual access performed by an individual, providing in at least near real time data indicating a malicious reputation of at least one IP address and providing in at least near real time data indicating that the IP address used in the at least one actual access performed by the individual has a malicious reputation.

Preferably, the data indicating a malicious reputation of at least one IP address used in the at least one actual access performed by the individual is provided from at least one data source outside of the enterprise computer network.

Preferably, at least one existing actual access to a data element in the enterprise computer network triggers the providing of the data relating to an IP address of a computer used in at least one actual access.

Preferably, data is provided on a scheduled basis to analyze actual accesses to at least one data element in the enterprise computer network.

Additionally or alternatively, the data is provided in accordance with at least one of user defined rule, which is based at least on time and on existence of the actual access.

Preferably, a notification from an external source triggers providing a retroactive analysis of past actual accesses to at least one data element in the enterprise computer network.

Preferably, the notification triggers scrutiny of future actual accesses to at least one data element in the enterprise computer network.

BRIEF DESCRIPTION OF THE DRAWINGS

The present invention will be understood and appreciated more fully based on the following detailed description taken in conjunction with the drawings in which.

DETAILED DESCRIPTION OF PREFERRED EMBODIMENTS

Figure 1A:
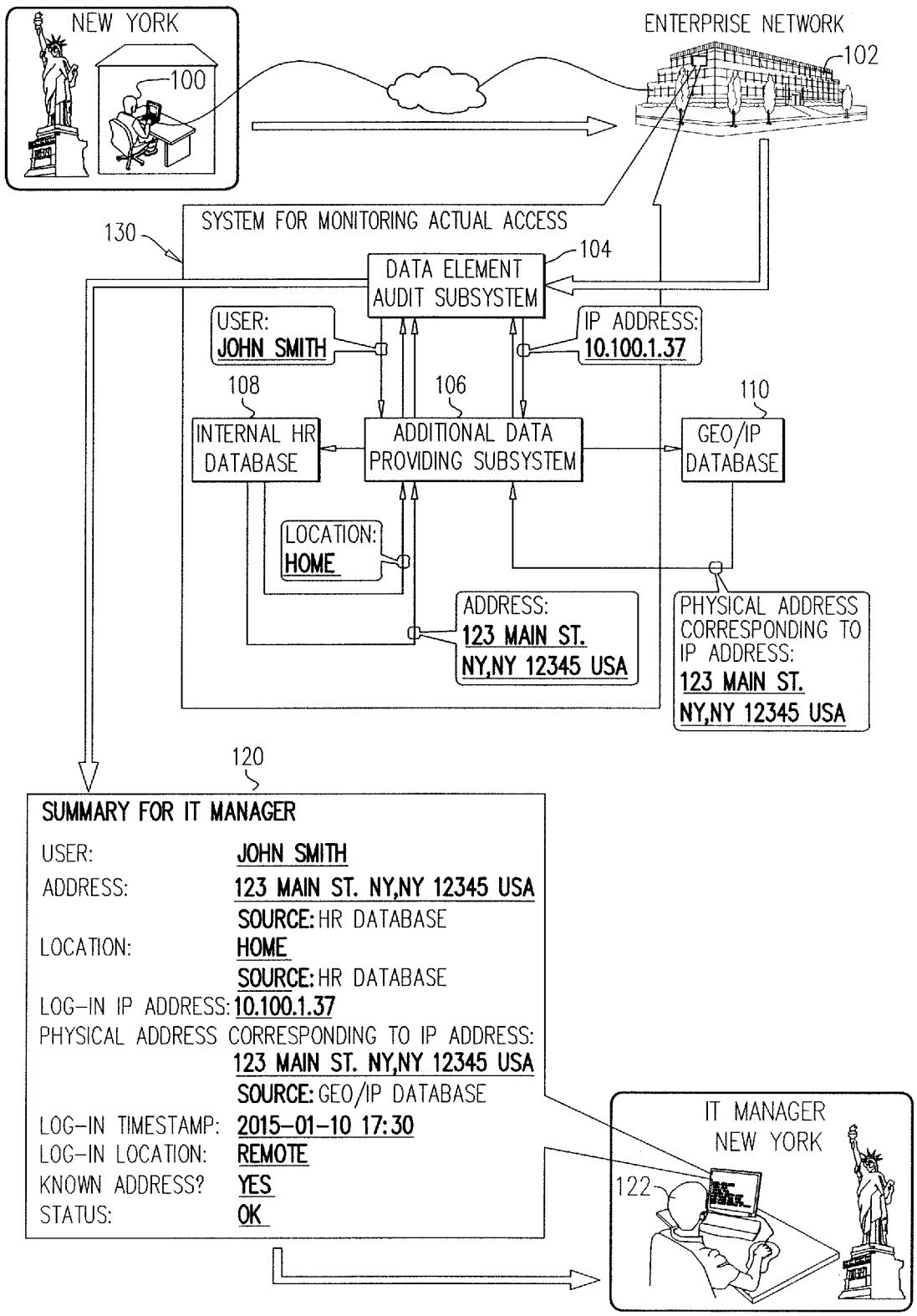
FIGS. 1A and 1B are simplified partially pictorial, partially block diagram illustrations of a system for monitoring access to data elements in a computer network, showing first and second access scenarios respectively, constructed and operative in accordance with a preferred embodiment of the present invention.
Figure 1B:
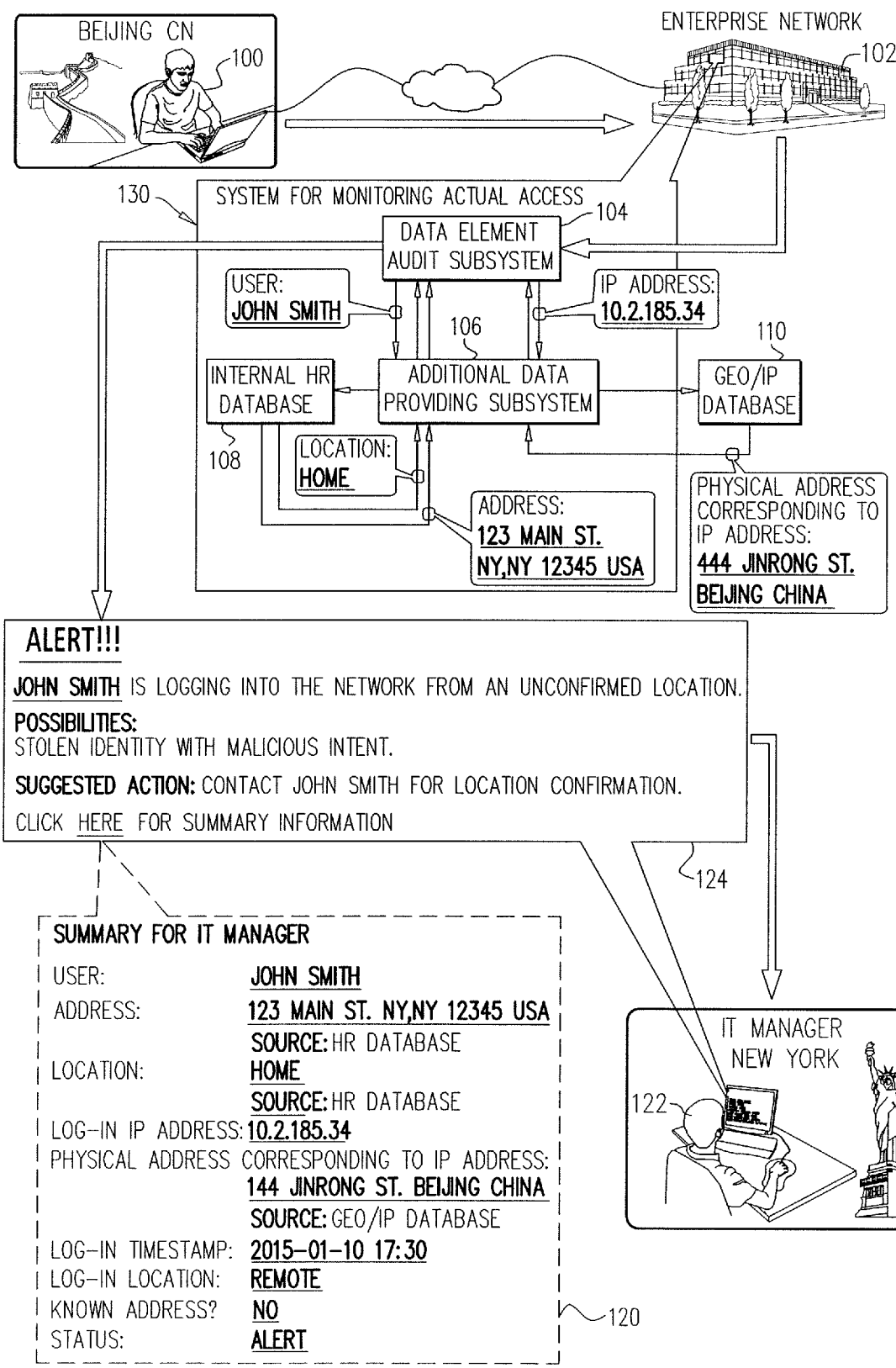

Reference is now made to FIGS. 1A and 1B, which are simplified partially pictorial, partially block diagram illustrations of a system for monitoring access to data elements in a computer network, in first and second access scenarios respectively, constructed and operative in accordance with a preferred embodiment of the present invention.

As seen in FIGS. 1A and 1B, a user 100, legitimate in the case of FIG. 1A and illegitimate in the case of FIG. 1B, has recently logged into an enterprise computer network, here designated by reference numeral 102.

In the cases illustrated in FIGS. 1A and 1B, log-in data for the given log-in event by user 100 is preferably continuously captured by a Data Element Audit Subsystem 104, which Data Element Audit Subsystem 104 is preferably connected to the enterprise computer network 102.

Data Element Audit Subsystem 104 preferably provides audit output data in at least near real time relating to actual access to data elements in enterprise computer network 102. The audit output data may include at least one of a time stamp, identification of an accessor, user depository stored data regarding the accessor, accessed data element data, affected data element data, type of access operation, source IP address of access and access outcome data in at least near real time, relating to actual access to data elements in enterprise computer network 102. In this example at least the following log-in data is preferably captured by Data Element Audit Subsystem 104: USER NAME, IP ADDRESS OF COMPUTER USED FOR LOG-IN.

In accordance with a preferred embodiment of the present invention, the Data Element Audit Subsystem 104 preferably transmits at least a part of the audit output data captured thereby to an Additional Data Providing Subsystem 106. Here, by way of example, the Data Element Audit Subsystem 104 preferably transmits a USER NAME-based query to Additional Data Providing Subsystem 106.

Additional Data Providing Subsystem 106 in turn preferably utilizes at least part of the audit output data received from Data Element Audit Subsystem 104 for providing additional data which is not part of the audit output data. Additional Data Providing Subsystem 106 preferably receives the output data from Data Element Audit Subsystem 104 and utilizes the output data in at least near real time. The additional data provided by Additional Data Providing Subsystem 106 may be automatically provided in response to the audit output received from the Data Element Audit Subsystem 104. Additional Data Providing Subsystem 106 may automatically search enterprise computer network 102 in order to find data sources useful thereto.

Here, by way of example, Additional Data Providing Subsystem 106 preferably communicates with a database, such as a human resources database 108 within the enterprise computer network 102 to retrieve user name-based data, such as the physical home address of the user, as recorded in the human resources database 108.

Additionally or alternatively, the USER NAME-based query may be sent by the Additional Data Providing Subsystem 106 to other databases, such as databases within or outside the enterprise computer network, to ascertain other physical addresses which are known to be legitimately associated with the USER NAME.

Further in accordance with a preferred embodiment of the present invention, the Data Element Audit Subsystem 104 preferably transmits an IP ADDRESS OF COMPUTER USED FOR LOG-IN-based query to the Additional Data Providing Subsystem 106. Additional Data Providing Subsystem 106 in turn communicates with a database, such as an external commercially available GEO/IP database 110, in order to retrieve IP ADDRESS OF COMPUTER USED FOR LOG-IN-based data, such as the physical address associated with the IP address of the computer used for log-in.

Additionally in accordance with a preferred embodiment of the present invention, the results of the USER NAME-based query and of the IP ADDRESS OF COMPUTER USED FOR LOG-IN-based query are supplied back to the Additional Data Providing Subsystem 106. The Additional Data Providing Subsystem 106 preferably checks to see if the physical address associated with the IP address of the computer used for log-in matches either the physical home address corresponding to the user name or ally other physical addresses which are known to be legitimately associated with the user name.

Once the checking has been completed, the Additional Data Providing Subsystem 106 preferably supplies the results of the USER NAME-based query and the results of the IP ADDRESS OF COMPUTER USED FOR LOG-IN-based query, as well as the results of the check that was performed, back to the Data Element Audit Subsystem 104.

In a scenario where the log-in is legitimate, such as in the case illustrated in FIG. 1A, an audit data summary 120 may be supplied by the Data Element Audit Subsystem 104 to an IT manager 122 of enterprise computer network 102, as needed.

In the example shown in FIG. 1A, where the user 100 is logging in from his home, the Data Element Audit Subsystem 104. preferably provides a LEGIT LOG-IN output indication, as seen in FIG. 1A in summary window 120 in the fields: "Known Address?: YES" and "Status: OK".

In a case where the log-in is illegitimate, as in FIG. 1B, automatic protective measures, such as an immediate real time or near real time alert to an IT security manager may be provided. Specifically, the Data Element Audit Subsystem 104 may send the IT Manager 122 an alert 124 including the reason for the alert, possible scenarios as to the cause, suggested action items, and a link to view the summary of the audit data of the log-in event 120.

In the example shown in FIG. 1B, where the user is logging in from a location not known to be legitimately associated with the USER NAME, such as Beijing China, a SUSPECT LOG-IN output indication is provided, as seen in FIG. 1B in the "Summary for IT Manager" 120 window in the fields: "Known Address?: NO" and "Status: ALERT".

It is understood that Data Element Audit Subsystem 104, in combination with Additional Data Providing Subsystem 106, preferably forms a system 130 for monitoring actual access to data elements in an enterprise computer network and providing associated data, which system 130 preferably operates in at least near real time.

Figure 2A:
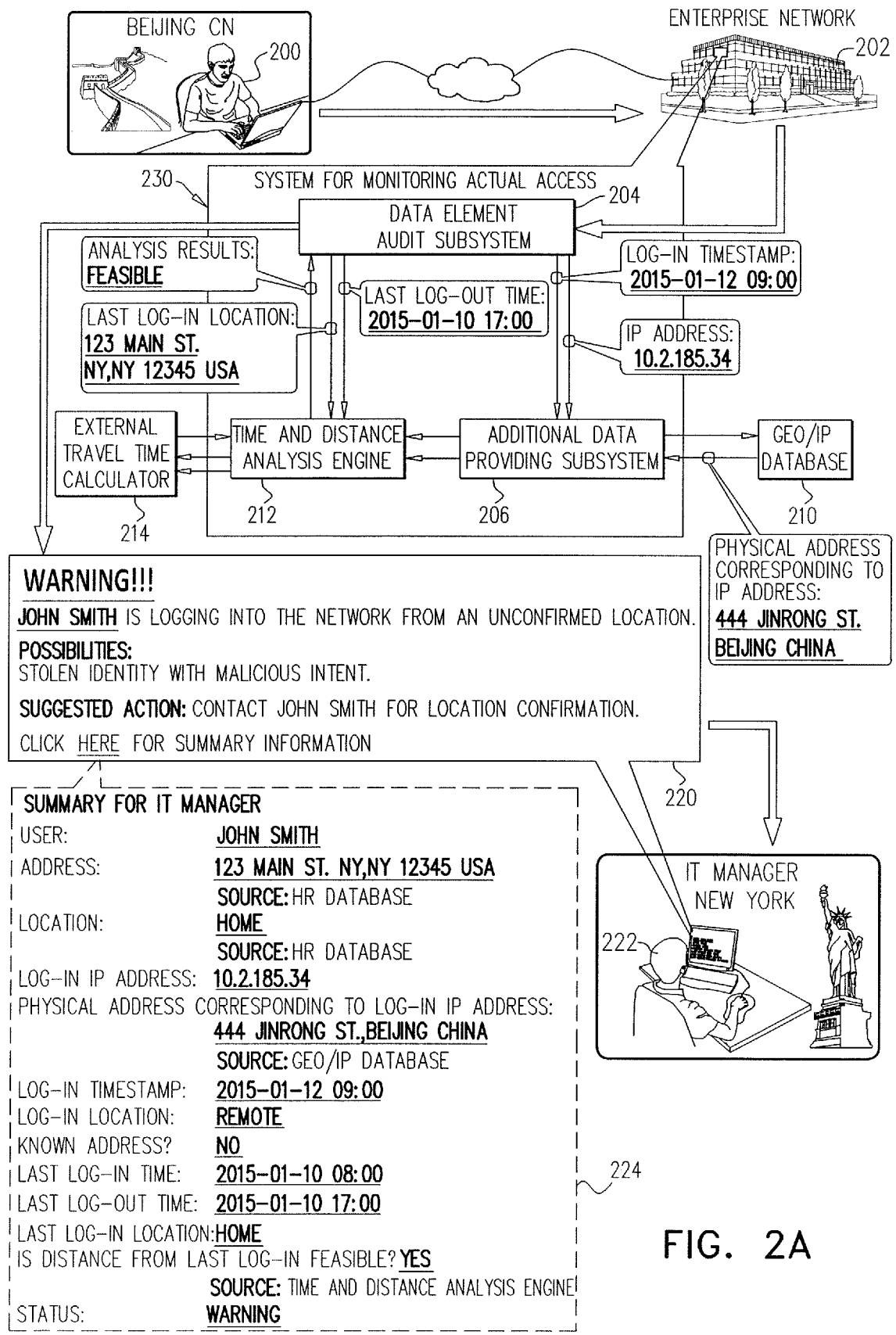
FIGS. 2A and 2B are simplified partially pictorial, partially block diagram illustrations of a system for monitoring access to data elements in a computer network, showing first and second access scenarios respectively, constructed and operative in accordance with another preferred embodiment of the present invention.
Figure 2B:
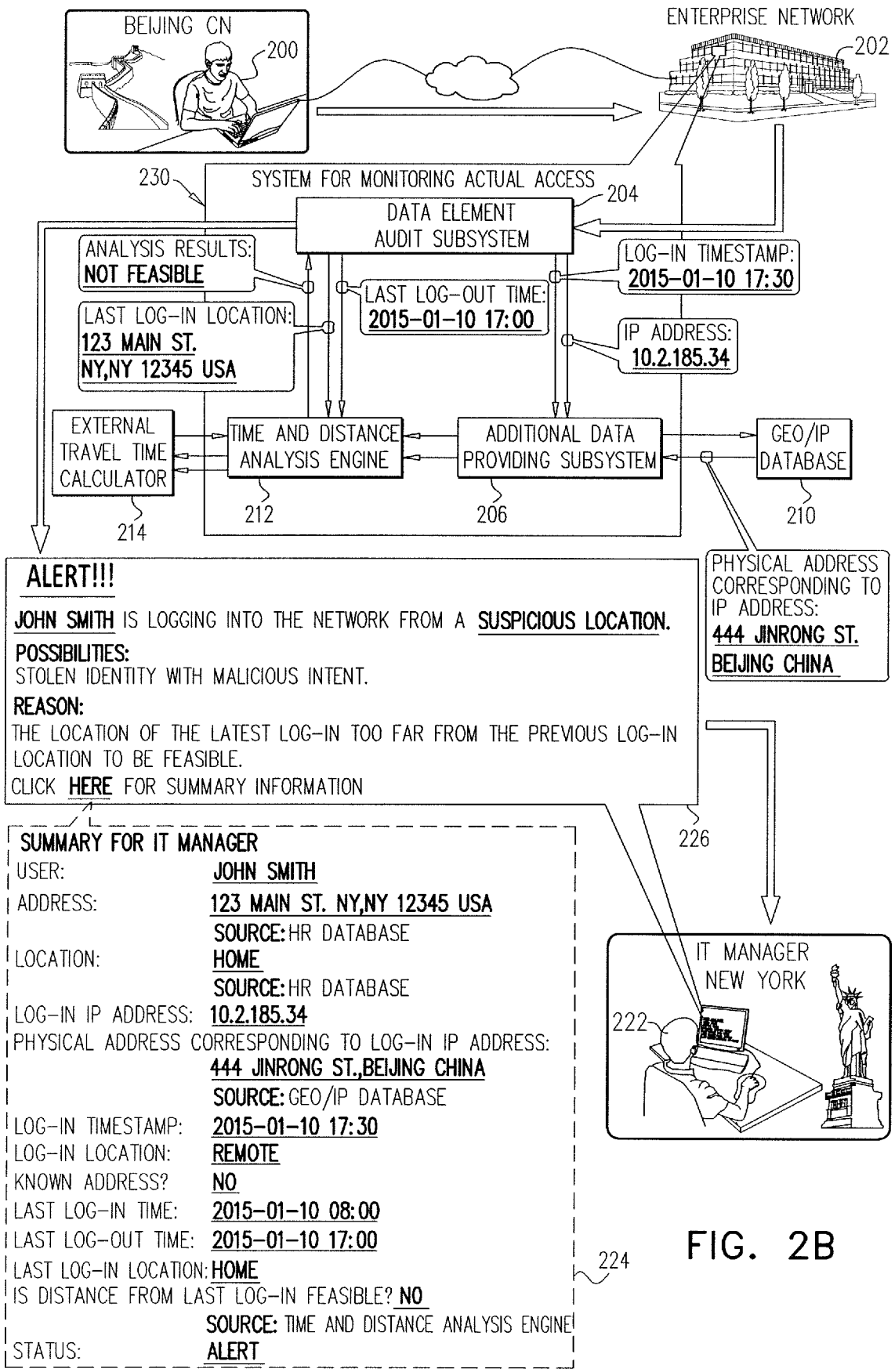

Reference is now made to FIGS. 2A and 2B, which are simplified partially pictorial, partially block diagram illustrations of a system for monitoring access to data elements in a computer network, showing first and second access scenarios respectively, constructed and operative in accordance with another preferred embodiment of the present invention.

As seen in FIGS. 2A and 2B, a user 200, legitimate in the case of FIG. 2A and illegitimate in the case of FIG. 2B, is logging into an enterprise computer network, here designated by a reference numeral 202.

In the cases illustrated in FIGS. 2A and 2B, audit data for the given log-in event by user 200 is preferably continuously captured by a Data Element Audit Subsystem 204 which is preferably connected to the enterprise computer network 202. In this example at least the following log-in data is preferably captured: USER NAME, IP ADDRESS OF COMPUTER USED FOR LOG IN, LOG-IN TIMESTAMP, LAST LOG-OUT TIMESTAMP and LAST LOG-IN LOCATION. Log-in data for a given log-in event is preferably provided by Data Element Audit Subsystem 204 in at least near real time.

In accordance with a preferred embodiment of the present invention, the Data Element Audit Subsystem 204 preferably transmits an IP ADDRESS OF COMPUTER USED FOR LOG-IN-based query to an Additional Data Providing Subsystem 206. Additional Data Providing Subsystem 206 in turn communicates with a database, such as an external commercially available GEO/IP database 210, in order to retrieve IP-address-of-the-computer-used-for-log-in-based-data, such as the physical address associated with the IP address of the computer used for log-in.

Preferably the results of the IP ADDRESS OF COMPUTER USED FOR LOG-IN-based query are supplied by the external GEO/IP database 210 to the Additional Data Providing Subsystem 206.

Further in accordance with a preferred embodiment of the present invention, the Data Element Audit Subsystem 204 preferably supplies LAST LOG-OUT TIMESTAMP and LAST LOG-IN LOCATION to a Time and Distance Analysis Engine 212. Time and Distance Analysis Engine 212 is preferably also supplied with the results of the IP ADDRESS OF COMPUTER USED FOR LOG IN-based query from the Additional Data Providing Subsystem 206. Preferably, the Additional Data Providing Subsystem 206 provides the results of the IP ADDRESS OF COMPUTER USED FOR LOG IN-based query, including the physical address associated with the IP address of the computer used for log-in, in at least near real time.

Preferably, the Time and Distance Analysis Engine 212 supplies the results of the IP ADDRESS OF COMPUTER USED FOR LOG IN-based query, such as the physical address associated with the IP address of the computer used for log-in, as well as the LAST LOG-IN LOCATION, to an External Travel Time Calculator 214.

Time and Distance Analysis Engine 212 preferably retrieves from External Travel Time Calculator 214 an indication of the minimum time required to travel between the two locations, namely between the location associated the present log-in and the last log-in location. An external Travel Time Calculator 214 suitable for use in embodiments of the present invention may be of a type commercially available from GOOGLE® GOOGLE MAPS®, WAZE®, MAPQUEST®, in order to retrieve an indication of the minimum travel time between two locations.

Based on the retrieved time data from the External Travel Time Calculator 214, the LAST LOG-OUT TIMESTAMP and the current LOG-IN TIMESTAMP, the Time and Distance Analysis Engine 212 preferably calculates and indicates whether it is realistic for user 200 to have travelled from the previous log-in location to the location indicated by the IP ADDRESS OF COMPUTER USED FOR LOG-IN-based query, within the time duration indicated by the difference between the timestamp of the last log-out and the timestamp captured in the present log-in event. Time and Distance Analysis Engine 212 preferably provides an indication of whether it is realistic for user 200 to have travelled from the previous to the present log-in location in at least near real time.

In the example shown in FIG. 2A, the Time and Distance Analysis Engine 212 provides an analysis result to the Data Element Audit Subsystem 204 indicating that it is realistic for the user to have travelled the distance between the two geographical locations within the time duration indicated by the difference in log-out/log-in timestamps.

The Data Element Audit Subsystem 204 then supplies a warning notification 220 to an IT Manager 222, which warning notification 220 preferably includes at least a statement of the cause of the warning, possible explanations of that cause, suggested actions to be taken by the IT Manager and a link to view a summary 224 of audit data of the log in event. As seen in the SUMMARY FOR IT MANAGER window 224, particularly significant fields include: KNOWN ADDRESS?: NO, IS DISTANCE FROM LAST LOGIN FEASIBLE?: YES.

The warning notification 220 may be supplied in response to a request by the IT manager 222 from the Data Element Audit Subsystem 204, or may be included in a periodically scheduled summary report including similar log-in events within a specified timeframe.

In the example shown in FIG. 2B, the Time and Distance Analysis Engine 212 provides an analysis result to the Data Element Audit Subsystem 204 indicating that it is not realistic for the user to have travelled the distance between the two locations within the time duration indicated by the difference in log-out/log-in timestamps.

The Data Element Audit Subsystem 204 then supplies an alert notification 226 to IT Manager 222, which alert notification 226 preferably includes at least a statement of the cause of the alert, possible explanations for that cause, the reason why the alert was triggered and a link to view the summary 224 of audit data of the log-in event. As seen in the SUMMARY FOR IT MANAGER window 224, particularly significant fields include: KNOWN ADDRESS?: NO, IS DISTANCE FROM LAST LOGIN FEASIBLE?: NO In both of the cases of FIGS. 2A and 2B, automatic protective measures, such as an immediate real time or near real time notification to an IT security manager are preferably provided.

It is understood that Data Element Audit Subsystem 204, in combination with Additional Data Providing Subsystem 206 and Time and Distance Analysis Engine 212, preferably form a system 230 for monitoring actual access to data elements in an enterprise computer network and for providing associated data, which system 230 preferably operates in at least near real time.

Figure 3A:
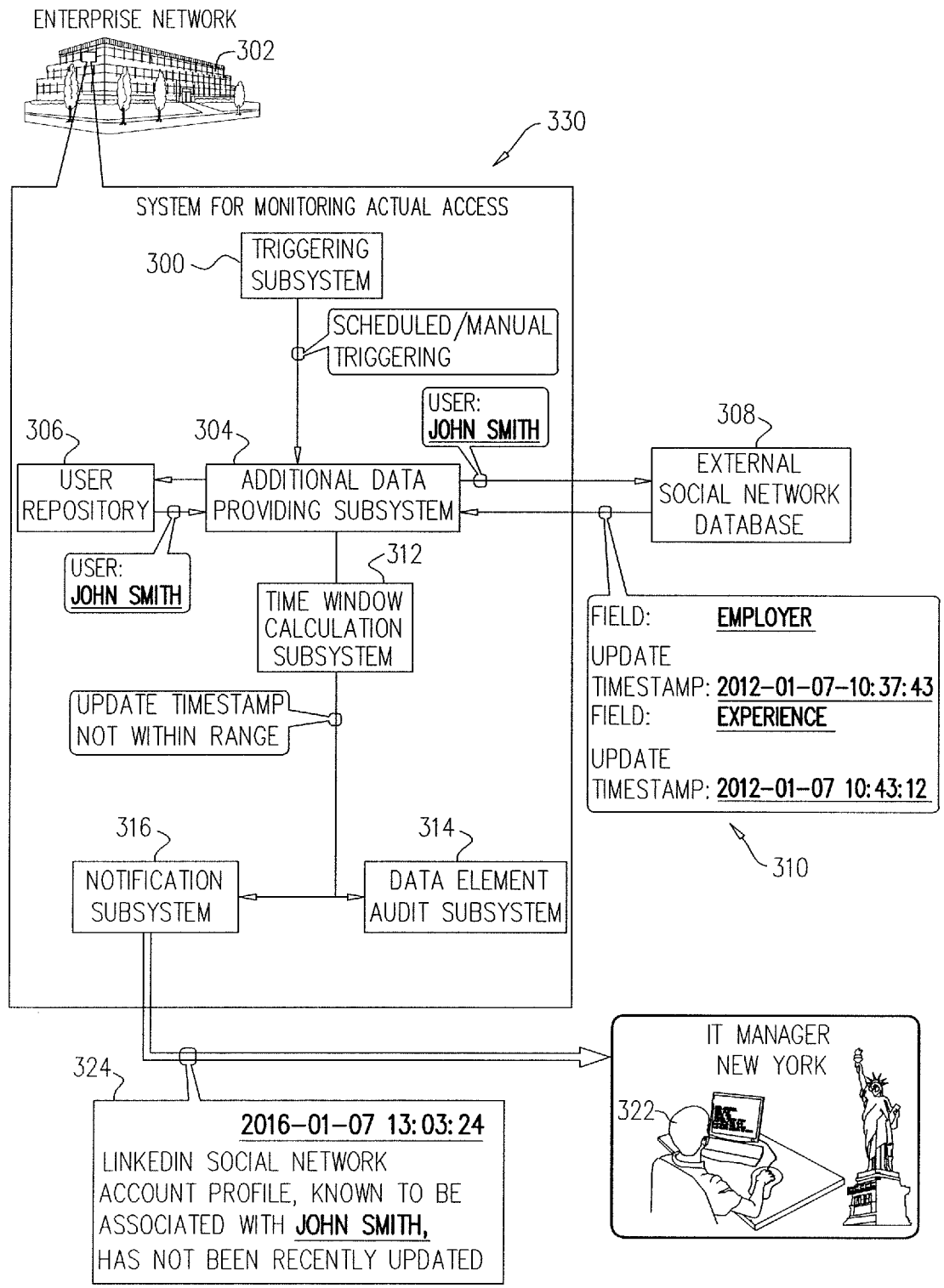
FIGS. 3A and 3B are simplified partially pictorial, partially block diagram illustrations of a system for monitoring access to data elements in a computer network, in first and second access scenarios respectively, constructed and operative in accordance with a further preferred embodiment of the present invention.
Figure 3B:
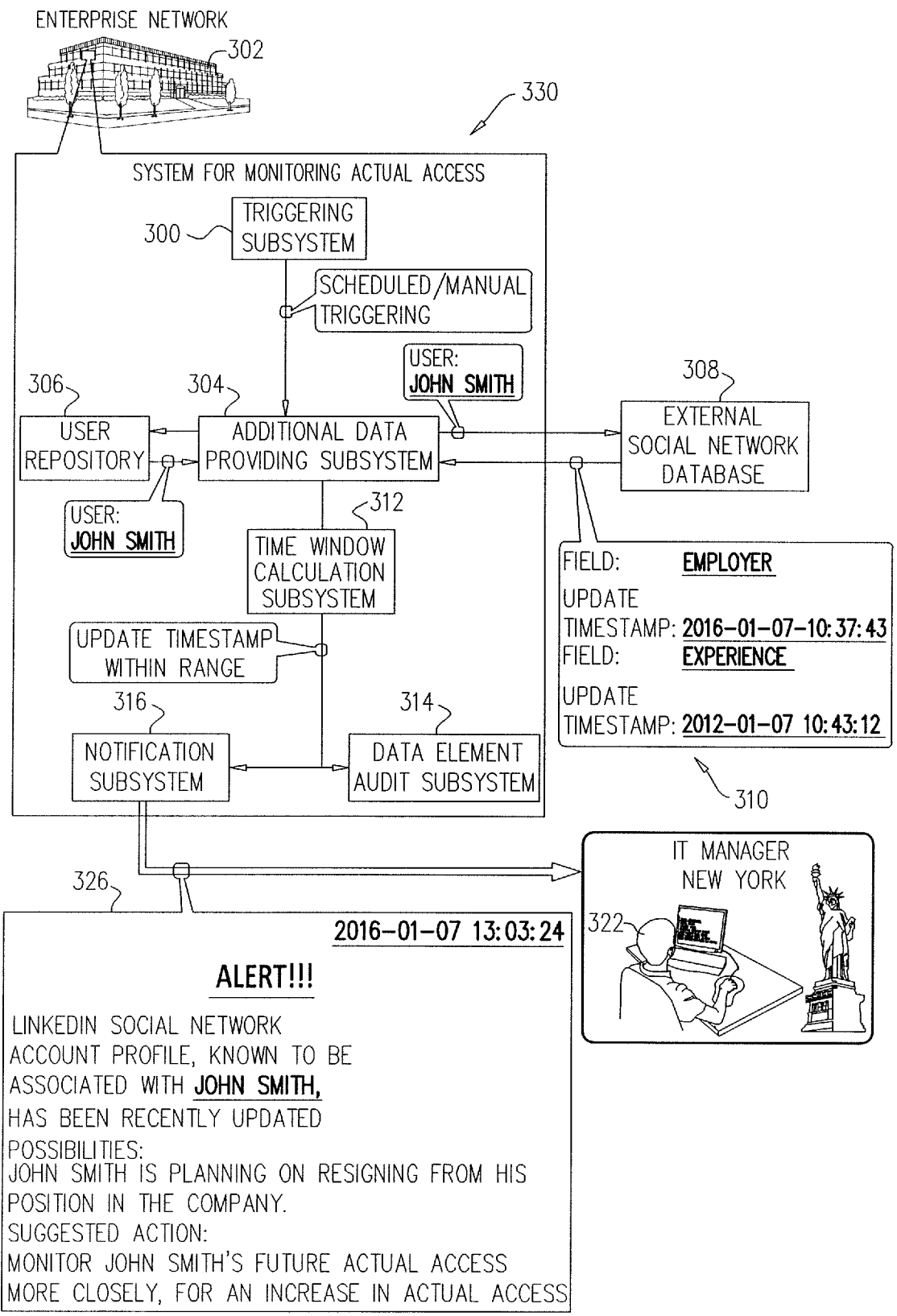

Reference is now made to FIGS. 3A and 3B, which are simplified partially pictorial, partially block diagram illustrations of a system for monitoring access to data elements in a computer network, in first and second access scenarios respectively, constructed and operative in accordance with a further preferred embodiment of the present invention.

In accordance with a preferred embodiment of the present invention, a Triggering Subsystem 300 connected to an enterprise computer network 302 is preferably used to trigger a process of providing data, preferably metadata, from a social media network and ascertaining on the basis thereof, whether a given enterprise user of enterprise computer network 302 has updated his/her social media network profile. It is appreciated that Triggering Subsystem 300 may form a part of system 130, illustrated in FIGS. 1A and 1B.

The Triggering Subsystem 300 preferably triggers the process by providing a triggering output to an Additional Data Providing Subsystem 304. The Triggering Subsystem 300 may be configured to trigger operation of Additional Data Providing Subsystem 304 based on detection of predetermined activity on a social network of the enterprise user, or in response to a manual request by an administrator. Triggering Subsystem 300 may additionally or alternatively be configured to trigger operation of Additional Data Providing Subsystem 304 in accordance with at least one user-defined rule, which rule may be based at least on time and detection of predetermined activity on the social network.

Additionally or alternatively, Triggering Subsystem 300 may trigger operation of Additional Data Providing Subsystem 304 periodically according to a predetermined schedule, in order to analyze the occurrence of predetermined activity on the social network of an enterprise user. Alternatively, Triggering Subsystem 300 may be configured to trigger the process continuously, in order to continuously analyze ongoing activity of enterprise users on the social network.

Responsive to the triggering output, the Additional Data Providing Subsystem 304 requests an enterprise user repository 306 to provide an enterprise user name corresponding to a given enterprise user.

The enterprise user repository 306 preferably maintains a list of user identifications, states, roles, group memberships, and passwords. The user repository 306 may be realized as an ACTIVE DIRECTORY® service, available from Microsoft Corporation, Redmond, Wash., USA. The user repository 306 is a logical unit that may be preferably distributed over one or more enterprise servers, e.g., a domain controller. In addition to storing user data, the user repository 306 preferably facilitates assignment of enterprise-wide policies, deployment of programs and application of critical updates to the entire organization. By way of example, an enterprise user repository suitable for use in embodiments of the present invention may be of the type described in U.S. Pat. No. 8,881,232, incorporated herein by reference.

Upon receipt by the Additional Data Providing Subsystem 304 of the enterprise user name from the enterprise user repository 306, the Additional Data Providing Subsystem 304 preferably communicates with resources external to the enterprise computer network, such as an external Social Database 308, and receives from these resources the metadata associated with social media network profile updates performed by the identified enterprise user. Preferably, the metadata includes a timestamp corresponding to an update made by the enterprise user to his/her profile, as seen at metadata timestamp fields 310.

Upon receiving from the external Social Database 308, a timestamp corresponding to an update, the Additional Data Providing Subsystem 304 may ascertain whether the update on the enterprise user's social media network account profile occurred within a predetermined range of time. Additional Data Providing Subsystem 304 may ascertain whether the update on the enterprise user's social media network account profile occurred within a predetermined range of time by providing the timestamp corresponding to an update to a Time Window Calculation Subsystem 312.

Updates which are found by Time Window Calculation Subsystem 312 to have occurred earlier than the predetermined range of time may be discarded or may be provided to a Data Element Audit Subsystem 314 for potential future audit purposes, as see in FIG. 3A. A record of such updates may be made available in the form of reports deliverable either upon request or on a scheduled basis. Additional Data Providing Subsystem 304 preferably provides the social network data to the Data Element Audit Subsystem 314 in at least near real time.

The Data Element Audit Subsystem 314 preferably stores data relating to enterprise users who have performed actual access within the enterprise computer network 300. Particularly, Data Element Audit Subsystem preferably provides data in at least near real time relating to an individual performing at least one actual access. Additional Data Providing Subsystem 304 may provide the social network data to the Data Element Audit Subsystem 314 in response to data received from the Data Element Audit Subsystem 314.

Optionally, upon an update having been found to have occurred outside of the predetermined range of time, the Additional Data Providing Subsystem 304 may trigger a Notification Subsystem 316.

As seen in FIG. 3A, the timestamp 310 provided by the External Social Network Database 308 shows that the enterprise user last updated his/her social media network profile on "2012-01-07-10:37:43". This timestamp is earlier than the predetermined time range, typically set to be one month prior to the date of notification.

In this case, an enterprise IT Manager 322 preferably receives a summary report 324 of an enterprise employee's social network account profile update status, stating that no recent updates have been made to the employee's social network account. The report may be provided either upon request, or on a scheduled basis.

Updates which are found by Time Window Calculation Subsystem 312 to have occurred within the predetermined range of time are preferably communicated by the Additional Data Providing Subsystem 304 to the Data Element Audit Subsystem 314 for potential future audit purposes, as seen in FIG. 3B. Additional Data Providing Subsystem 304 preferably provides the social network data to the Data Element Audit Subsystem 314 in at least near real time.

Upon an update having been found to have occurred within the predetermined range of time, Additional Data Providing Subsystem 304 preferably also triggers Notification Subsystem 316.

Upon an update having been found to have occurred within the predetermined range of time, the Notification Subsystem 316 is configured, responsive to a trigger from the Additional Data Providing Subsystem 304, to notify enterprise IT Manager 322 that a user has recently updated his/her social network profile. The notification may be in the form of an email, text message, pop-up notification on a remote computer used by the IT manager and connected to the enterprise computer network 302 or any other means of communication, various types of which are well known in the art.

As seen in FIG. 3B, the timestamp provided by the External Social Network Database 308, shows that the user last updated his/her social media network profile on "2016-01-07-10:37:43", which timestamp lies within the predetermined range of time of interest.

Updating of a social network account profile such as LINKEDIN® may indicate that an employee is planning on resigning from his/her position at the enterprise and is therefore editing their social media account profiles, such as LINKEDIN®, in order to attract potential new employers.

The enterprise IT Manager 322 receives an alert 326, in real time or in near real time. The alert preferably indicates that an enterprise user has recently updated his/her LINKEDIN® social network profile, may be potentially considering leaving the enterprise and therefore that action items should preferably be taken by the IT Manager.

Upon an update having been found to have occurred within the predetermined range of time, Time Window Calculation Subsystem 312 may trigger a retroactive analysis of past actual accesses by the enterprise user to at least one data element in enterprise computer network 302.

It is understood that Triggering Subsystem 300, Data Element Audit Subsystem 314, in combination at least with Additional Data Providing Subsystem 304 and Notification Subsystem 316, preferably form a system 330 for monitoring actual access to data elements in an enterprise computer network and for providing associated data, which system 330 preferably operates in at least near real time.

Figure 4A:
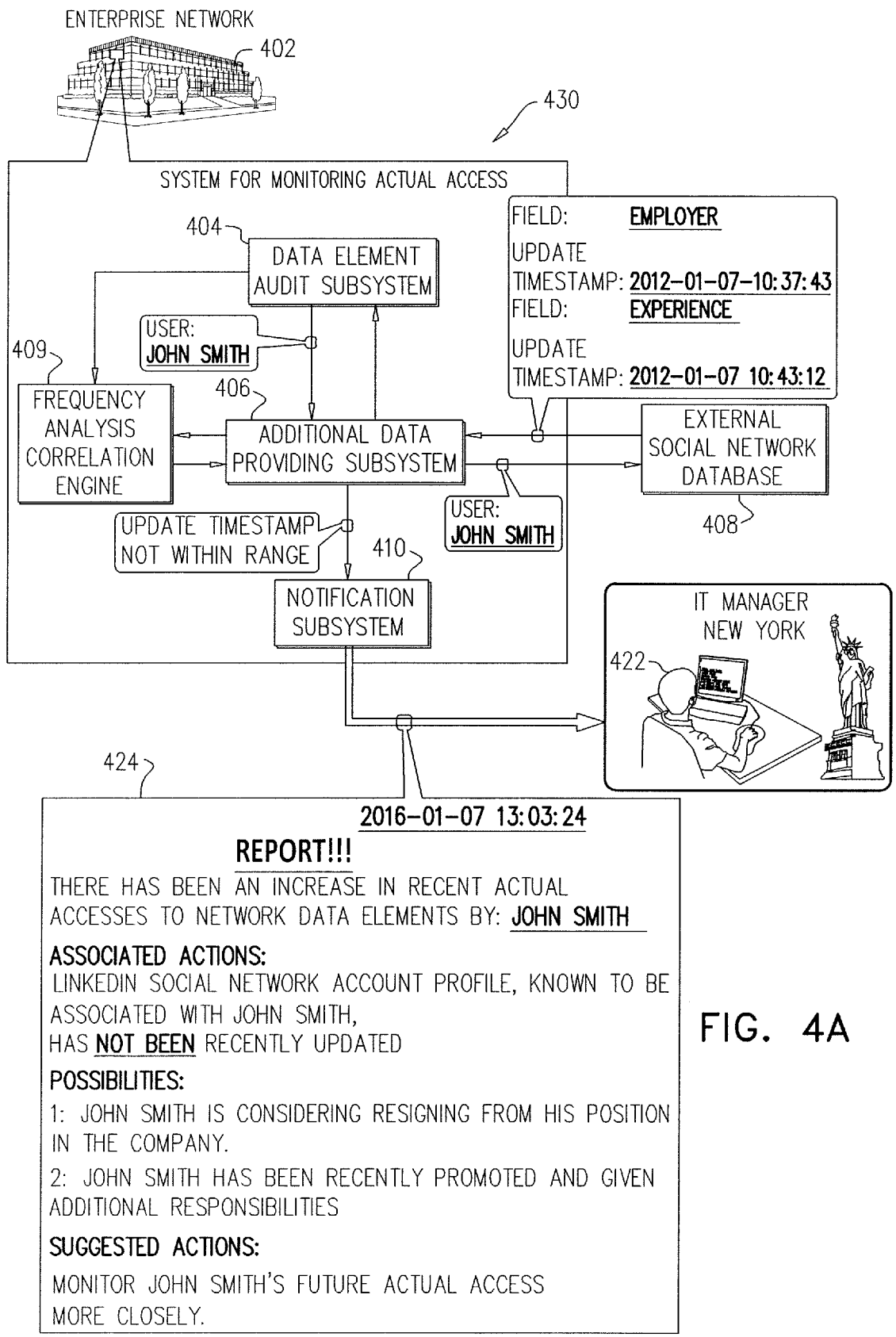
FIGS. 4A and 4B are simplified partially pictorial, partially block diagram illustrations of a system for monitoring access to data elements in a computer network, in first and second access scenarios respectively, constructed and operative in accordance with still another preferred embodiment of the present invention.
Figure 4B:
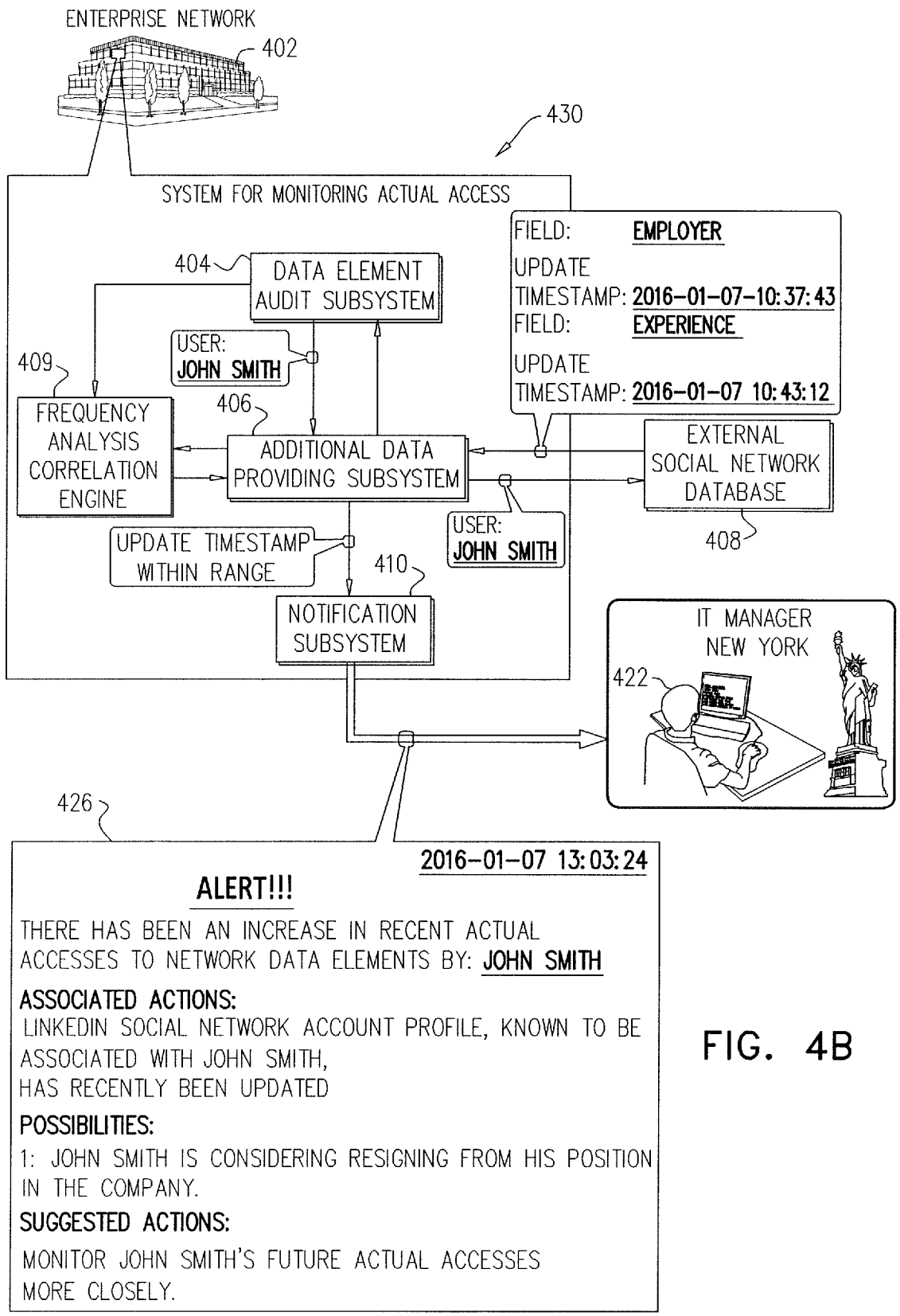

Reference is now made to FIGS. 4A and 4B, which are simplified partially pictorial, partially block diagram illustrations of a system for monitoring access to data elements in a computer network, in first and second access scenarios respectively, constructed and operative in accordance with still another preferred embodiment of the present invention.

FIG. 4A illustrates a scenario in which an enterprise IT manager is suspicious that an employee may be considering leaving the enterprise. The enterprise IT Manager therefore implements a review of the employee's recent activity on the enterprise computer network and generates a report thereof. In the scenario of FIG. 4A, the generated report shows the enterprise employee's recent activity as being anomalous, in terms of actual access to enterprise data elements. The report also indicates that no recent changes in social network accounts, profiles and/or status updates have been made.

Such a report may be provided upon request of an administrator or on a scheduled basis.

FIG. 4B illustrates a similar scenario, in which in addition to the report showing anomalous behavior by an employee in terms of actual access to enterprise data elements, the report also indicates that there have been recent updates to the employee's LINKEDIN® social network profile. In this case, the enterprise IT Manager may receive an alert, in real time or in near real time, indicative of these findings.

Anomalous behavior may be considered to be behavior that is uncharacteristic or unusual such as, but not limited to, actual access to data elements that have previously not been accessed by the employee, an increase or decrease in the number or frequency of actual accesses to data elements or absence of actual access to data elements. A threshold of anomalous behavior may be predetermined by the enterprise administration. A threshold may be, by way of example only, a change of 25% in the number or frequency of actual accesses compared to a typical or average number or frequency of actual accesses.

Updating a social network profile such as LINKEDIN® may indicate that the employee is planning on resigning from his/her position at the enterprise. Social network status updates associated with, or mentioning, the enterprise may indicate that the employee is dissatisfied with his/her current work environment. Relevant status updates may be detected using a predefined set of rules and/or dictionaries including keywords, which keywords may be predefined by the enterprise administration.

Turning now to FIGS. 4A and 4B, an enterprise computer network 402 may be connected to a Data Element Audit Subsystem 404. Data Element Audit Subsystem 404 preferably operates both as a data recorder and as an analysis engine.

As a data recorder, the Data Element Audit Subsystem 404 preferably records data relating to actual access events by enterprise employees, including attempted accesses which were successful as well as attempted unsuccessful accesses.

As an analysis engine, the Data Element Audit Subsystem 404 preferably develops a measure of similarity among users in their relationships to data elements, based on granted permissions and patterns of actual access. Particularly, Data Element Audit Subsystem 404 preferably provides, in at least near real time, data relating to a frequency of actual access of an enterprise user to at least one data element.

When anomalous behavior, such as a sudden increase in the frequency of actual accesses of an employee, is detected, the Data Element Audit Subsystem 404 preferably initiates a process of providing data, preferably metadata, from a social media network and ascertaining on the basis thereof, whether a given enterprise employee has updated his/her social media network profile and/or status.

The Data Element Audit Subsystem 404 preferably provides an initiating output, including the enterprise employee's name, to an Additional Data Providing Subsystem 406.

The Additional Data Providing Subsystem 406 preferably communicates with resources external to the enterprise computer network 402, such as external social databases 408. Additional Data Providing Subsystem 406 preferably receives from these resources metadata associated with social media network profile and/or status updates performed by the enterprise employee, indicating the existence of a predetermined activity by the enterprise employee on at least one social network. Additional Data Providing Subsystem 406 preferably operates in at least near real time to provide the social network data associated with the user's activity on the social network.

Upon receiving metadata from external social databases 408, preferably including a timestamp corresponding to an update, the Additional Data Providing Subsystem 406 preferably ascertains whether the update on the enterprise user's social media network account status matches the predefined set of rules and/or dictionaries. Status updates not matching rules of keywords are discarded. The Additional Data Providing Subsystem 406 additionally preferably ascertains whether the update on the enterprise user's social media network account profile, and/or the remaining status updates, occurred within a predetermined range of time.

Particularly preferably, Additional Data Providing Subsystem 406 preferably provides the social network data indicating a user's activity on the social network to a frequency analysis correlation engine 409. Frequency analysis correlation engine 409 preferably also receives from Data Element Audit Subsystem 404 data relating to changes in frequency of actual access by the user to data elements. Frequency analysis correlation engine 409 is preferably operative to provide correlation data indicating the existence or non-existence of a relationship between timing of a change in said frequency of actual access and the timing of said predetermined activity of said individual. Such correlation data is preferably provided by frequency analysis correlation engine 409 in at least near real time.

Social media updates which are found to have occurred earlier than a predetermined range of time, such that, for example, no correlation is found between the timing of the social media updates and timing of changes in frequency of actual access to data elements, may be discarded or provided to Data Element Audit Subsystem 404 for potential future audit purposes, as seen in FIG. 4A. Such reports may be delivered either upon request, or on a scheduled basis.

Optionally, upon an update having been found to have occurred outside of the predetermined range of time, the Additional Data Providing Subsystem 406 may trigger a Notification Subsystem 410. The Notification Subsystem 410 is preferably configured to notify an enterprise IT Manager 422 that an enterprise user had a recent change in number or frequency of actual accesses to enterprise data elements but did not recently update his/her social network profile and/or status. The notification may be in the form of a summary report 424 delivered as an email, text message, or pop-up notification on a remote computer used by the IT manager.

Social media updates which are found to have occurred within the predetermined range of time, such that, for example, a correlation is found to exist between the timing of the social media updates and timing of changes in frequency of actual access to data elements, are preferably communicated by the Additional Data Providing Subsystem 406 to the Data Element Audit Subsystem 404 for potential future audit purposes, as seen in FIG. 4B. Additionally, Additional Data Providing Subsystem 406 preferably activates Notification Subsystem 410.

The Notification Subsystem 410 is preferably configured to alert enterprise IT Manager 422 that an enterprise user, who has had a recent change in number of actual accesses to enterprise data elements, has also recently updated his/her social network profile and/or status. An alert 426 may be delivered as an email, text message, or pop-up notification on a remote computer used by the IT manager.

As seen in FIG. 4A, an enterprise user last updated his/her social media network profile on "2012-01-07-10:37:43", which timestamp is earlier than the predetermined range of time of interest. In contrast, in FIG. 4B, the enterprise user last updated his/her social media network profile on "2016-01-07-10:37:43" which timestamp is within the predetermined range of time of interest. As a result, in the scenario of FIG. 4A the IT Manager 422 may be provided with status summary report 424 of recent anomalous enterprise user behavior, whereas in the scenario illustrated in FIG. 4B, the IT Manager 422 preferably receives alert 426 preferably indicating that the enterprise user may be considering leaving the enterprise, and optionally also recommending actions to be taken.

It is understood that Data Element Audit Subsystem 404, in combination at least with Additional Data Providing Subsystem 406 and Notification Subsystem 410, preferably form at least part of a system 430 for monitoring actual access to data elements in an enterprise computer network and for providing associated data, which system 430 preferably operates in at least near real time. System 430 preferably serves to provide a clear picture of enterprise usage patterns, recommendations for security policy optimization, and alerts of anomalous user behavior.

Figure 5A:
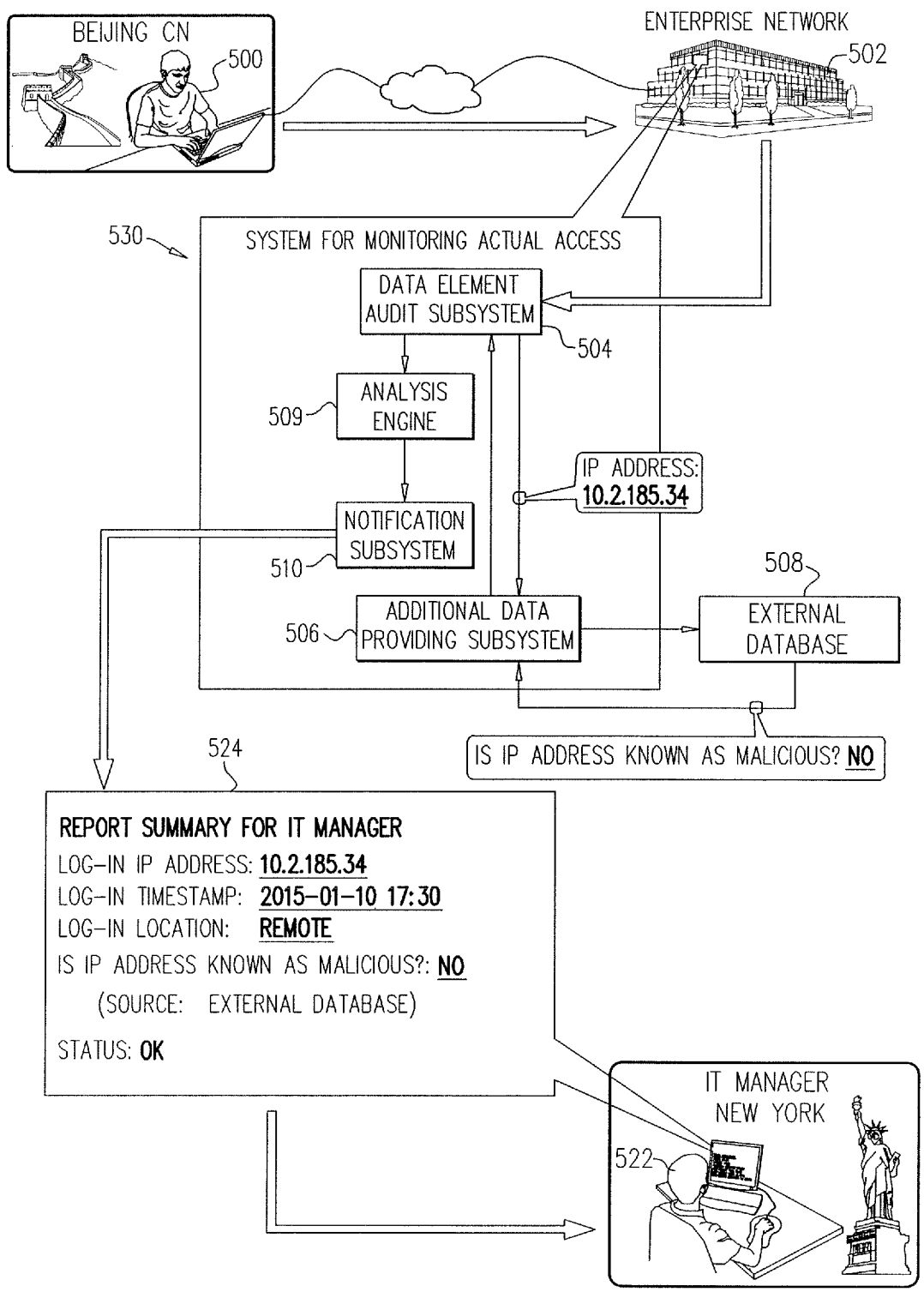
FIGS. 5A and 5B are simplified partially pictorial, partially block diagram illustrations of a system for monitoring access to data elements in a computer network, in first and second access scenarios respectively, constructed and operative in accordance with yet another preferred embodiment of the present invention.
Figure 5B:
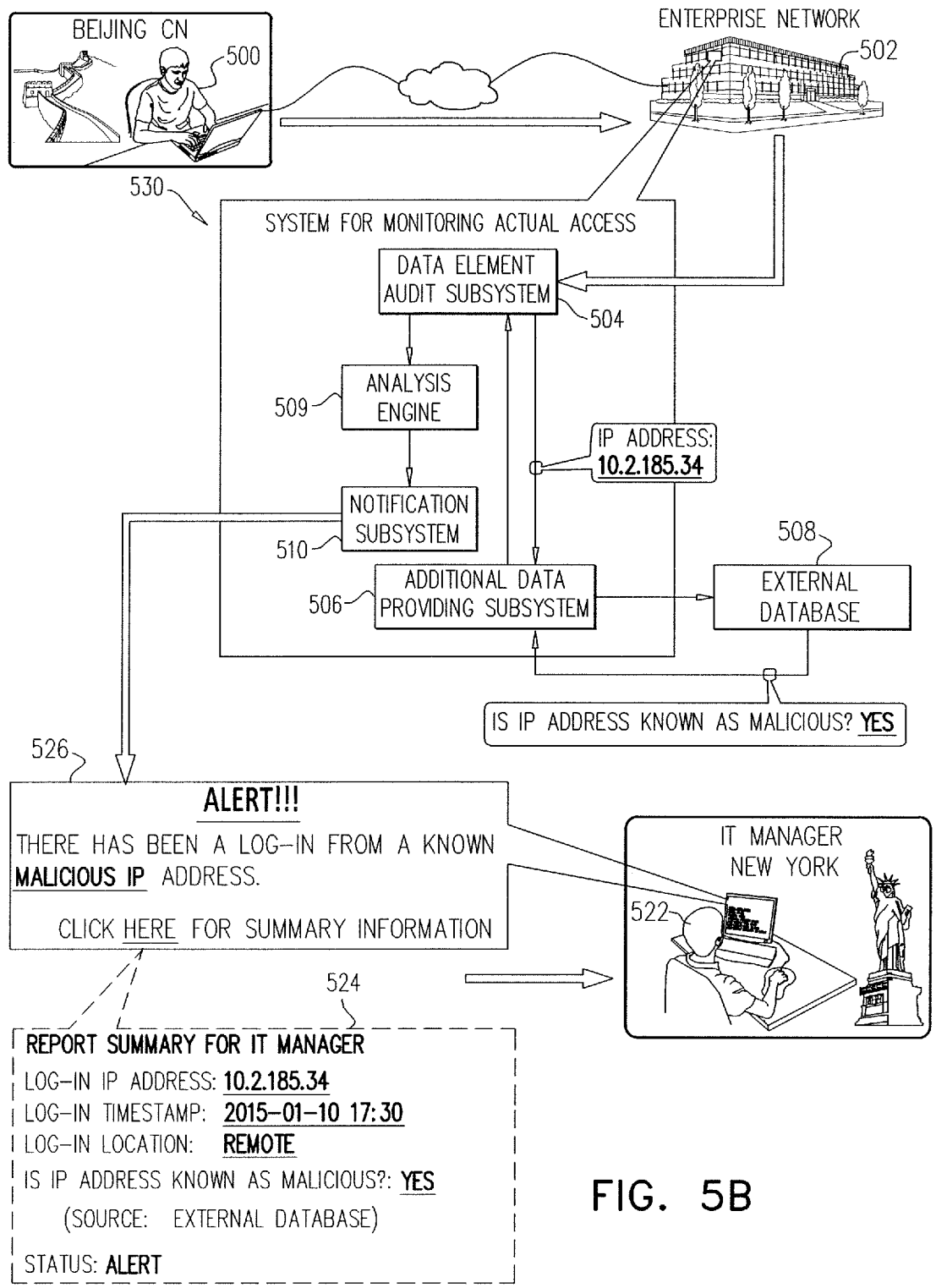

Reference is now made to FIGS. 5A and 5B, which are simplified partially pictorial, partially block diagram illustrations of a system for monitoring access to data elements in a computer network, in first and second access scenarios respectively, constructed and operative in accordance with yet another preferred embodiment of the present invention.

FIGS. 5A and 5B illustrate a preferred embodiment of a system of the present invention, in the case that an enterprise IT manager is performing a review of recent log-ins, such as log-ins by a user 500, from remote locations into an enterprise computer network 502. The system of the present invention preferably generates a report of archived log-in event data. It is appreciated that such a report may be generated periodically, upon demand or in response to a particular event.

In the scenario illustrated in FIG. 5A, the generated report indicates that enterprise employee 500 has recently logged into the enterprise computer network from a remote location and that the IP address used in the login event is legitimate and not identified as malicious.

In the scenario illustrated in FIG. 5B, the generated report indicates than an IP address used in a recent log-in event has been previously identified and labelled as malicious. As a result, the system generates a report and notifies the enterprise IT manager by way of an alert stating that there has been a log-in into the enterprise computer network from an illegitimate IP address. The enterprise IT manager may optionally proceed to expand the alert message and view a summary of the event in the generated report.

Turning now to FIGS. 5A and 5B, a Data Element Audit Subsystem 504 connected to the enterprise computer network 502 preferably continuously captures log-in event data. By way of example, the Data Element Audit Subsystem 504 preferably captures at least an IP address of a computer used in a remote log-in event.

The Data Element Audit Subsystem 504 preferably transmits an IP-Address-Of-Computer-Used-For-Log-In-based-query to an Additional Data Providing Subsystem 506, which Additional Data Providing Subsystem 506 in turn preferably communicates with an external, commercially available database 508.

The external database 508 preferably provides an output to the Additional Data Providing Subsystem 506 stating whether the IP address supplied by the Additional Data Providing Subsystem 506 to the external database 508 has been previously designated as malicious.

An IP address may be identified and labelled as potentially malicious when use of a device such as computer or mobile device having that IP address has been previously associated with malicious incidents or spamming activity. Commercially available online databases, such as www.ipvoid.com, provide data regarding IP addresses that have been previously labelled as malicious.

The Additional Data Providing Subsystem 506 preferably delivers the data received from the external database 508, to the Data Element Audit Subsystem 504, where the data is stored together with the existing log-in event data. The Additional Data Providing Subsystem 506 preferably provides the data in at least near real time.

It is appreciated that Additional Data Providing Subsystem 506 may be triggered to communicate with external database 508 to investigate status of an IP address on a scheduled basis, or in accordance with at least one user-defined rule based at least on time and occurrence of actual access to data elements by an enterprise user.

The Data Element Audit Subsystem preferably supplies the data concerning the status of the identified IP address and the log-in event data to an analysis engine 509.

In the embodiment of FIG. 5A, the data provided by the external database 508 indicates that the IP address used for the log-in has not previously been identified as malicious. Data Element Audit Subsystem 504 provides the analysis engine 509 with the requested archived log-in data and the IP address status data. Analysis engine 509 triggers generation and delivery to an IT manager 522, by a Notification Subsystem 510, of a summary report 524. As seen in FIG. 5A, the summary report 524 indicates that a remote log-in has occurred from a non-malicious IP address.

In the embodiment of FIG. 5B, the data provided by the external database 508 indicates that the IP address used for log-in was previously labelled and identified as malicious. Once stored with the existing event data, the Data Element Audit Subsystem 504 then provides the associated event data to the analysis engine 509, which in turn triggers generation of an alert 526 by Notification Subsystem 510, which alert 526 is preferably sent to the enterprise IT manager 522.

The Notification Subsystem 510 may be configured to notify the IT manager by email, text message, pop up notification or other forms of communication to a computer or mobile device, as are well known in the art.

In some cases, analysis engine 509 may be triggered by a notification received from an external source to provide a retroactive analysis of past actual accesses to data elements in enterprise network 502. Such a notification may also trigger scrutiny of future accesses to at least one data element in enterprise network 502.

It is understood that Data Element Audit Subsystem 504, in combination at least with Additional Data Providing Subsystem 506 and Notification Subsystem 510, preferably form at least part of a system 530 for monitoring actual access to data elements in an enterprise computer network and for providing associated data, which system 530 preferably operates in at least near real time.

It will be appreciated by persons skilled in the art that the present invention is not limited by what has been particularly claimed hereinbelow. Rather, the scope of the invention includes various combinations and subcombinations of the features described hereinabove as well as modifications and variations thereof as would occur to persons skilled in the art upon reading the forgoing description with reference to the drawings and which are not in the prior art.

The invention claimed is:

1. A system comprising a processor and a non-transitory, tangible computer-readable medium in which computer program instructions are stored, which instructions, when read by a computer, cause the computer to enable monitoring actual access to data elements in an enterprise computer network and providing associated data, the system further comprising:
   an at least near real time data element audit subsystem providing audit output data including at least one of a time stamp, identification of an accessor, user depository stored data regarding said accessor, accessed data element data, affected data element data, type of access operation, source IP address of access and access outcome data, in at least near real time, relating to actual access of said accessor to data elements within said enterprise computer network;
   an additional data providing subsystem operative to:
      receive in at least near real time at least a part of said audit output data relating to said actual access of said accessor;
      automatically search said enterprise computer network in order to find at least one useful data source outside of said enterprise computer network;
      utilize said at least part of said audit output data for automatically retrieving, in response to said audit output data, additional data relating to said actual access of said accessor from said at least one useful data source outside of said enterprise computer network, which said additional data is not part of said audit output data; and
      utilize a combination of at least said part of said audit output data relating to said actual access to said data elements within said enterprise computer network and said additional data relating to said actual access of said accessor from said at least one data source outside of said enterprise computer network for said monitoring said actual access to said data elements in said enterprise computer network and providing a monitoring access output for said actual access; and
   a protective measure subsystem operative to provide at least one automatic protective measure in at least near real time to said enterprise computer network when said monitoring access output indicates that said actual access may be problematic.

2. A system according to claim 1 and wherein said at least one automatic protective measure comprises an alert.

3. A system according to claim 2 and wherein said alert is provided to an IT security manager.

4. A method for monitoring actual access to data elements in an enterprise computer network and providing associated data, the method comprising:
   providing audit output data including at least one of a time stamp, identification of an accessor, user depository stored data regarding said accessor, accessed data element data, affected data element data, type of access operation, source IP address of access and access outcome data, in at least near real time, relating to actual access of said accessor to data elements within said enterprise computer network;
   receiving at least part of said audit output data relating to said actual access of said accessor;
   automatically searching said enterprise computer network in order to find at least one useful data source outside of said enterprise computer network;
   utilizing said at least part of said audit output data for automatically receiving, in response to said audit output data, additional data relating to said actual access of said accessor from said at least one useful data source outside of said enterprise computer network which said additional data is not part of said audit output data;
   utilizing a combination of at least said part of said audit output data relating to said actual access to said data elements within said enterprise computer network and said additional data relating to said actual access of said accessor from said at least one data source outside of said enterprise computer network for said monitoring said actual access to said data elements in said enterprise computer network and providing a monitoring access output for said actual access; and
   providing at least one automatic protective measure in at least near real time to said enterprise computer network when said monitoring access output indicates that said actual access of said accessor may be problematic.

5. A method according to claim 4, and wherein said receiving and said utilizing occur automatically in at least near real time.

6. A method according to claim 4 and wherein said providing at least one automatic protective measure comprises providing an alert.

7. A method according to claim 6 and wherein said providing an alert comprises providing said alert to an IT security manager.

8. A system comprising a processor and a non-transitory, tangible computer-readable medium in which computer program instructions are stored, which instructions, when read by a computer, cause the computer to enable monitoring actual access to data elements in an enterprise computer network and providing associated data, the system further comprising:
   a data element audit subsystem providing audit data including at least data relating to time stamps of at least two actual accesses of a particular accessor and IP addresses of computers used for said two actual accesses of said particular accessor;
   an additional data providing subsystem operative to:
      receive at least a part of said audit data relating to said actual accesses of said accessor;
      automatically search said enterprise computer network in order to find at least one useful data source outside of said enterprise computer network;
      utilize said at least part of said audit data for automatically retrieving, in response to said audit output data, additional data relating to said actual accesses of said accessor from said at least one useful data source outside of said enterprise computer network, said additional data comprising physical location data corresponding to said IP addresses of said computers used for said two actual accesses of said particular accessor, said additional data not being part of said audit output data; and
      utilize a combination of at least said part of said audit output data and said additional data relating to said actual accesses of said accessor from said at least one data source outside of said enterprise computer network for said monitoring said actual access to said data elements in said enterprise computer network;
   a time and distance analysis engine providing a monitoring access output for said actual access indicating whether a time difference between said time stamps and a geographical separation between said physical locations of said at least two actual accesses of said particular accessor may feasibly correspond one to another, in view of a minimum time duration required to physically travel between said physical locations of said at least two actual accesses of said particular accessor; and a protective measure subsystem operative to provide at least one automatic protective measure to said enterprise computer network in at least near real time when said monitoring access output indicates that said actual access may be problematic.

9. A system according to claim 8 and wherein said data element audit subsystem provides said audit data in at least near real time.

10. A system according to claim 8 and wherein said additional data providing subsystem provides said physical location data in at least near real time.

11. A system according to claim 8 and wherein said time and distance analysis engine provides an indication of whether said time difference between said time stamps and said geographical separation between said physical locations of said at least two actual accesses may feasibly correspond one to another in at least near real time.

12. A system according to claim 8 and wherein said at least one automatic protective measure comprises an alert.

13. A system according to claim 12 and wherein said alert is provided to an IT security manager.

14. A method for monitoring actual access to data elements in an enterprise computer network and providing associated data, the method comprising:

providing audit data including at least data relating to time stamps of at least two actual accesses of a particular accessor and IP addresses of computers used for said two actual accesses of said particular accessor;

receiving at least a part of said audit data relating to said actual accesses of said accessor;

automatically searching said enterprise computer network in order to find at least one useful data source outside of said enterprise computer network;

utilizing said at least part of said audit data for automatically retrieving, in response to said audit output data, additional data relating to said actual accesses of said accessor from said at least one useful data source outside of said enterprise computer network, said additional data comprising physical location data corresponding to said IP addresses of said computers used for said two actual accesses of said particular accessor, said additional data not being part of said audit output data;

utilizing a combination of at least said part of said audit output data and said additional data relating to said actual accesses of said accessor from said at least one data source outside of said enterprise computer network for said monitoring said actual access to said data elements in said enterprise computer network;

providing a monitoring access output for said actual access indicating whether a time difference between said time stamps and a geographical separation between said physical locations of said at least two actual accesses of said particular accessor may feasibly correspond one to another in view of a minimum time duration required to physically travel between said physical locations of said at least two actual accesses of said particular accessor; and providing at least one automatic protective measure to said enterprise computer network in at least near real time when said monitoring access output indicates that said actual access of said accessor may be problematic.

15. A method according to claim 14 and wherein said audit data is provided in at least near real time.

16. A method according to claim 14 and wherein additional data is provided from at least one data source outside of said enterprise computer network.

17. A method according to claim 14 and wherein said providing a monitoring access output comprises providing said monitoring access output in at least near real time.

18. A method according to claim 14 and wherein said providing at least one automatic protective measure comprises providing an alert.

19. A method according to claim 18 and wherein said providing an alert comprises providing said alert to an IT security manager.

\* \* \* \* \*